United States Patent
Choi et al.

(10) Patent No.: US 11,401,898 B2
(45) Date of Patent: Aug. 2, 2022

(54) METHOD FOR MANUFACTURING A WATERPROOF FELT DUCT AND A WATERPROOF FELT DUCT

(71) Applicants: Hyundai Motor Company, Seoul (KR); Kia Motors Corporation, Seoul (KR); HOAN CO., LTD., Ansan-si (KR)

(72) Inventors: Won-Seop Choi, Anyang-si (KR); Sung-Hyuk Yoon, Seoul (KR); Ju-Ho Han, Suwon-si (KR); Jun-Haeng Cho, Asan-si (KR)

(73) Assignees: Hyundai Motor Company, Seoul (KR); Kia Motors Corporation, Seoul (KR); HOAN CO., LTD., Ansan-si (KR)

(*) Notice: Subject to any disclaimer, the term of this patent is extended or adjusted under 35 U.S.C. 154(b) by 171 days.

(21) Appl. No.: 16/656,395

(22) Filed: Oct. 17, 2019

(65) Prior Publication Data

US 2020/0166011 A1 May 28, 2020

(51) Int. Cl.
*F02M 35/10* (2006.01)
*F24F 13/02* (2006.01)
(Continued)

(52) U.S. Cl.
CPC ...... *F02M 35/10334* (2013.01); *F02M 35/10006* (2013.01); *F02M 35/1034* (2013.01);
(Continued)

(58) Field of Classification Search
CPC .......... F02M 35/1034; F02M 35/10347; F02M 35/10321; F02M 35/10334; F02M 35/10;
(Continued)

(56) References Cited

U.S. PATENT DOCUMENTS

| | | | |
|---|---|---|---|
| 6,553,953 B1 * | 4/2003 | Fujihara | F02M 35/1272 123/184.21 |
| 2006/0151104 A1 * | 7/2006 | Jacobs | B32B 7/12 156/308.2 |
| 2007/0278034 A1 * | 12/2007 | Yamaura | F02M 35/10347 181/229 |

(Continued)

FOREIGN PATENT DOCUMENTS

| | | | |
|---|---|---|---|
| KR | 10-1488279 B1 | | 1/2015 |
| KR | 20150069441 A | * | 6/2015 |

OTHER PUBLICATIONS

Translation of KR20150069441 (Year: 2015).*

*Primary Examiner* — Matthew P Travers
(74) *Attorney, Agent, or Firm* — Morgan, Lewis & Bockius LLP (57) ABSTRACT

A method for manufacturing a waterproof felt duct may include (a) laminating a waterproof film on one side of a first nonwoven fabric and laminating a second nonwoven fabric on the waterproof film laminated on the first nonwoven fabric to form a laminated body; (b) forming a waterproof felt base material by thermally adhering the laminated body; (c) cutting the waterproof felt base material into a desired shape; (d) molding a duct while surrounding the waterproof felt base material cut into the desired shape around the external surface of a molding jig having a worm gear shape; (e) heat-treating the molded duct; (f) cooling the heat-treated duct; and (g) ejecting the cooled duct from the molding jig.

11 Claims, 8 Drawing Sheets

(51) Int. Cl.
  *B29C 51/14*  (2006.01)
  *B29C 53/42*  (2006.01)
  *B29C 53/60*  (2006.01)
  *B29C 53/58*  (2006.01)

(52) U.S. Cl.
  CPC ............ *F02M 35/10091* (2013.01); *F02M 35/10321* (2013.01); *F02M 35/10347* (2013.01); *F24F 13/0245* (2013.01); *B29C 51/145* (2013.01); *B29C 53/42* (2013.01); *B29C 53/586* (2013.01); *B29C 53/60* (2013.01); *F02M 35/10013* (2013.01)

(58) Field of Classification Search
  CPC ....... F02M 35/10006; F02M 35/10013; F02M 35/10091; F02M 35/1272; F02M 35/1283; F24F 13/0218; F24F 13/0245; F24F 13/0281; F16L 11/02; B29C 51/145; B29C 53/42; B29C 53/586; B29C 53/60
  See application file for complete search history.

(56) References Cited

U.S. PATENT DOCUMENTS

| | | | |
|---|---|---|---|
| 2011/0170804 A1* | 7/2011 | Mamiye | B65D 35/28 383/38 |
| 2013/0048205 A1* | 2/2013 | Xiong | B29C 43/14 156/245 |
| 2013/0052377 A1* | 2/2013 | Tani | B29C 49/0005 428/34.1 |
| 2014/0027001 A1* | 1/2014 | Matzen | B29C 48/07 138/121 |
| 2018/0298855 A1* | 10/2018 | Kimura | F02M 35/0218 |
| 2019/0136806 A1* | 5/2019 | Kimura | F02M 35/1272 |
| 2020/0049112 A1* | 2/2020 | Kimura | F02M 35/10347 |

* cited by examiner

METHOD FOR MANUFACTURING A WATERPROOF FELT DUCT AND A WATERPROOF FELT DUCT

CROSS-REFERENCE(S) TO RELATED APPLICATIONS

The present application claims priority to Korean Patent Application No. 10-2018-0149917, filed on Nov. 28, 2018, the entire contents of which is incorporated herein for all purposes by this reference.

BACKGROUND OF THE INVENTION

Field of the Invention

The present invention relates to a waterproof felt duct, and more particularly to a method for manufacturing a waterproof felt duct having a waterproof property in a duct itself and a waterproof felt duct manufactured by the method.

Description of Related Art

Generally, when fuel and air are required to operate a combustion engine which is a power source for driving a vehicle, normal outside air is supplied from the outside thereof to the engine through an air intake system.

The air intake system of a vehicle may include a duct provided as a flow path of the outside air, an air cleaner having a function of filtering foreign substance such as dust or sand contained in the inflow air, and units such as a sound-absorbing pad for reducing vibration and noise and the like wherein a polyurethane cover is separately applied to the air intake system to prevent inflow of foreign substance and to provide a waterproof function.

However, since the air intake system provided with the cover has a large volume, there are several problems in that: it is difficult to freely arrange the air intake system inside an engine compartment; production efficiency is lowered due to a separate process for assembling the cover; and deterioration of a duct of the air intake system occurs because even if the cover has a waterproof function, the duct is hydrolyzed and damaged in progress of time by moisture and the like entering from the outside air.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for manufacturing a waterproof felt duct to which a waterproof felt having a waterproof property to be secured by a duct material of a main body forming a duct rather than by a separate cover for securing a waterproof property is applied, and also a waterproof felt duct manufactured by the method.

Other objects and advantages of the present invention may be understood by the following description and become apparent with reference to the exemplary embodiments of the present invention. Also, it is obvious to those skilled in the art to which the present invention pertains that the objects and advantages of the present invention may be realized by the means as claimed and combinations thereof.

In accordance with one aspect of the present invention to accomplish the object as mentioned above, there is provided a method for manufacturing a waterproof felt duct including: (a) laminating a waterproof film on one side of a first nonwoven fabric and laminating a second nonwoven fabric on the waterproof film laminated on the first nonwoven fabric to form a laminated body; (b) forming a waterproof felt base material by thermally adhering the laminated body; (c) cutting the waterproof felt base material into a desired shape; (d) molding a duct while surrounding the waterproof felt base material cut into the desired shape around the external surface of a molding jig having a worm gear shape; (e) heat-treating the molded duct; (f) cooling the heat-treated duct; and (g) ejecting the cooled duct from the molding jig.

The first nonwoven fabric may be a nonwoven fabric including polyethylene terephthalate of 20 to 40% by weight and low melting point fibers of 60 to 80% by weight.

The waterproof film may be a laminate made of a polyethylene film and a polyamide 6 film.

The second nonwoven fabric may be a nonwoven fabric including polyethylene terephthalate of 60 to 80% by weight and low melting point fibers of 20 to 40% by weight.

In the step (a), the laminated body is formed such that with reference to length from one end portion to the other end portion of the laminated body taken in a longitudinal direction of the laminated body, length of the first nonwoven fabric is shorter than length of the waterproof film and length of the second nonwoven fabric is longer than the length of the waterproof film.

In the step (b), the waterproof felt base material is formed by thermally adhering the laminated body at temperature of 130 to 160° C. and pressure of 90 to 110 kgf.

In the step (d), the duct is molded by bending the waterproof felt base material surrounded around the external surface of the molding jig having a worm gear shape by a knife-type bending tool as the molding jig rotates.

In the step (e), the molded duct is heat-treated at temperature of 240 to 250° C. for 10 minutes to 60 minutes in an electric oven.

In the step (f), the heat-treated duct is cooled for 5 to 30 minutes by cold air at temperature of 5 to 15° C.

In accordance with another aspect of the present invention, there is provided a waterproof felt duct made by the manufacturing method as mentioned above wherein the waterproof felt duct is made of a waterproof felt base material having a multiple adhesion structure, the waterproof felt base material being formed by thermally adhering a plurality of laminated bodies, each of the laminated bodies including a first nonwoven fabric, a waterproof film laminated on the first nonwoven fabric and a second nonwoven fabric laminated on the waterproof film, and wherein each of the laminated bodies is configured such that with reference to length from one end portion to the other end portion of the laminated body, the first nonwoven fabric is shorter than length of the waterproof film and length of the second nonwoven fabric is longer than the length of the waterproof film.

The waterproof felt base material is formed by arranging the laminated bodies such that a second nonwoven fabric of an adjacent laminated body is accommodated at one end portion of a first nonwoven fabric of one laminated body and on a lower surface of a waterproof film laminated on the first nonwoven fabric and adhering the laminated bodies together.

The first nonwoven fabric, the waterproof film and the second nonwoven fabric are the same as described above and therefore repeated description thereon will not be made below.

The waterproof felt duct of the present invention has a waterproof function of the duct itself without a separate cover and thus it does not require any separate cover so that it is possible not only to reduce the number of parts and secure the internal space of the engine compartment, but also to improve aesthetic appearance of the engine compartment.

Furthermore, the waterproof felt duct of the present invention is superior in waterproof performance and evaluation results in terms of noise, vibration and friction as compared with existing ducts.

It is to be understood that both the foregoing general description and the following detailed description of the present invention are exemplary and explanatory and are intended to provide further explanation of the present invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, constitution and operation of the present invention will be described in more detail with reference to exemplary embodiments of the present invention and comparative examples. However, this is merely representation of some of examples of the present invention and thus the present invention is not limited thereto.

Figure 1:
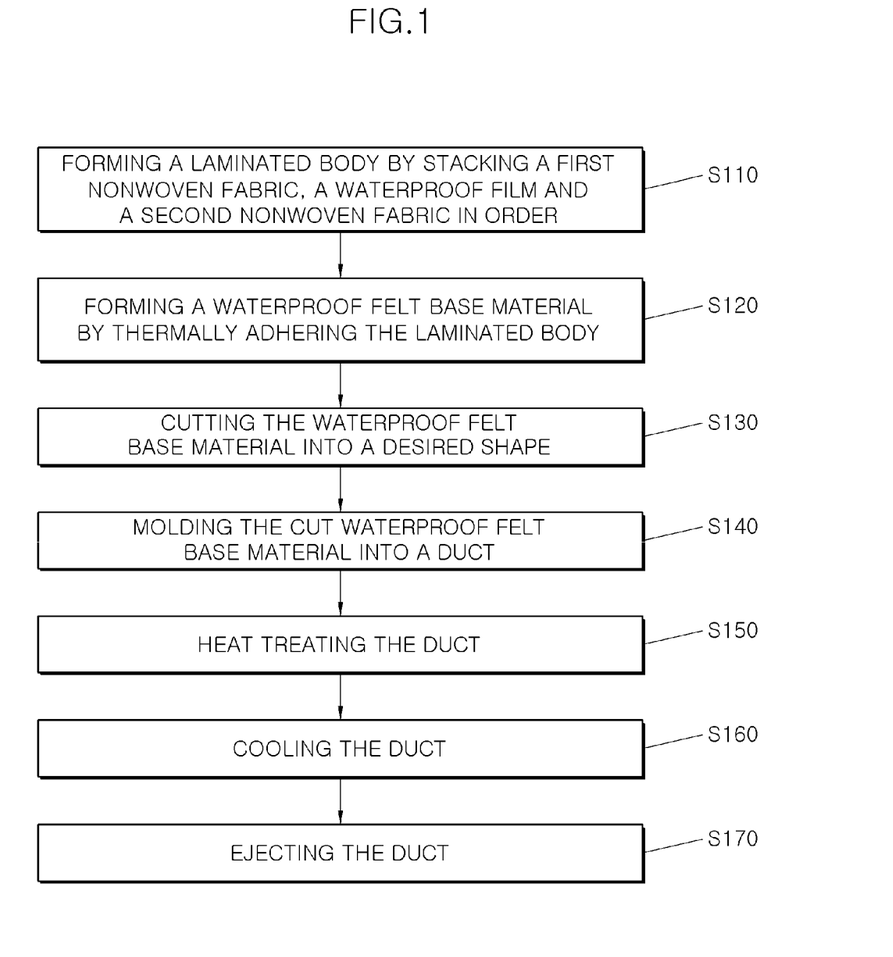
FIG. 1 is a flowchart of a method for manufacturing a waterproof felt duct according to an exemplary embodiment of the present invention.

FIG. 1 shows a flowchart of a method for manufacturing a waterproof felt duct according to an exemplary embodiment of the present invention.

As shown in FIG. 1, a method for manufacturing a waterproof felt duct according to an exemplary embodiment of the present invention includes: (a) forming a laminated body by laminating a first nonwoven fabric, a waterproof film and a second nonwoven fabric in order (S110); (b) forming a waterproof felt base material by thermally adhering the laminated body (S120); (c) cutting the waterproof felt base material into a desired shape (S130); (d) molding a duct using the waterproof felt base material cut into the desired shape (S140); (e) heat-treating the duct (S150); (f) cooling the duct (S160); and (g) ejecting the duct (S170).

The step (a) referred to as S110 is a step of forming a laminated body for making a waterproof felt base material, in which a waterproof film is laminated on one side of the first nonwoven fabric and a second nonwoven fabric is laminated on the waterproof film laminated on the first nonwoven fabric to form the laminated body.

The first nonwoven fabric may be a nonwoven fabric made of polyethylene terephthalate of 20 to 40% by weight and low melting point fibers of 60 to 80% by weight and preferably a nonwoven fabric including polyethylene terephthalate of 30% by weight and low melting point fibers of 70% by weight.

The waterproof film is a laminate made of a polyethylene film and a polyamide 6 film, each of which has a predetermined thickness, and provides waterproof property.

The second nonwoven fabric may be a nonwoven fabric including polyethylene terephthalate of 60 to 80% by weight and low melting point fibers of 20 to 40% by weight and preferably a nonwoven fabric including polyethylene terephthalate of 70% by weight and low melting point fibers of 30% by weight.

Figure 2:
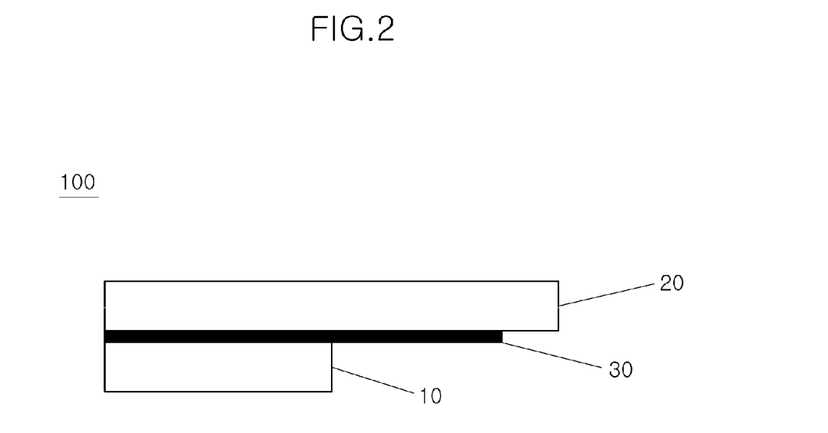
FIG. 2 is a diagram showing a cross section of a laminated body according to an exemplary embodiment of the present invention.

In the step (a), the laminated body 100 is formed such that with reference to length from one end portion to the other end portion of the laminated body taken in a longitudinal direction of the laminated body, length of the first nonwoven fabric 10 is shorter than length of the waterproof film and length of the second nonwoven fabric 20 is longer than the length of the waterproof film 30. The cross section of the laminated body 100 is configured as shown in FIG. 2.

The step (b) of forming a waterproof felt base material by thermally adhering the laminated body, which is referred to as S120, is a step of forming a waterproof felt base material by stacking a plurality of laminated bodies produced in the step (a) and thermally adhering them together.

Figure 3:
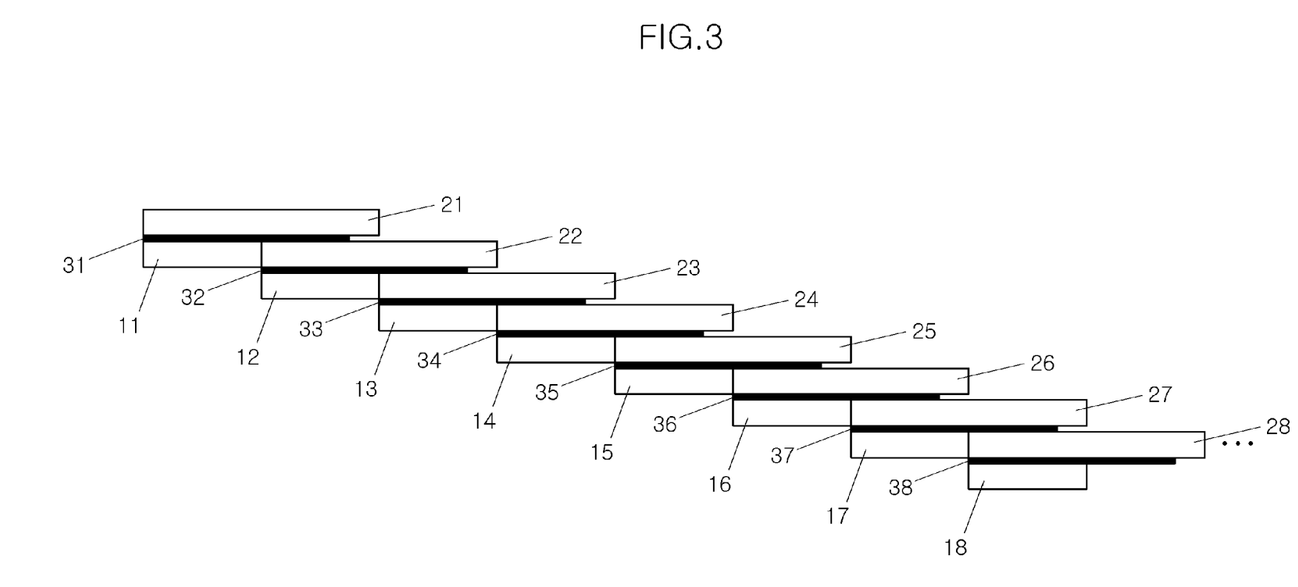
FIG. 3 is a diagram showing a cross section of a waterproof felt base material according to an exemplary embodiment of the present invention.

FIG. 3 is a diagram showing a cross section of a waterproof felt base material according to an exemplary embodiment of the present invention.

As shown in FIG. 3, the waterproof felt base material is formed by arranging the laminated bodies 100 such that a second nonwoven fabric 21, 22, 23, 24, 25, 26, 27, 28 of an adjacent laminated body is accommodated at one end portion of a first nonwoven fabric 11, 12, 13, 14, 15, 16, 17, and 18 of one laminated body 100 and on a lower surface of a waterproof film 31, 32, 33, 34, 35, 36, 37, and 38 laminated on the first nonwoven fabric 11, 12, 13, 14, 15, 16, 17, and 18 and continuously adhering the laminated bodies 100s together. At the instant time, the waterproof felt base material is formed by thermally adhering the laminated bodies at temperature of 130 to 160° C. and pressure of 90 to 110 kgf. The thermal adhesion is performed at pressure of 100 kgf. for about 30 seconds while keeping the top portion at 160° C. and the bottom portion at 130° C.

The waterproof felt base material formed as mentioned above has a structure improving waterproof performance because the waterproof film having the waterproof property is coupled in a manner of wrapping the first and second nonwoven fabrics.

In the step (c) referred to as S130, the waterproof felt base material formed by thermal adhesion is cut into a desired shape. In the instant case, the waterproof felt base material may be cut to have width of for example about 32 mm. However, the width of the waterproof felt base material is not limited to the above width but may be adjusted according to distance and pitch of bents of the duct in a process of forming the duct to be performed later.

Figure 4:
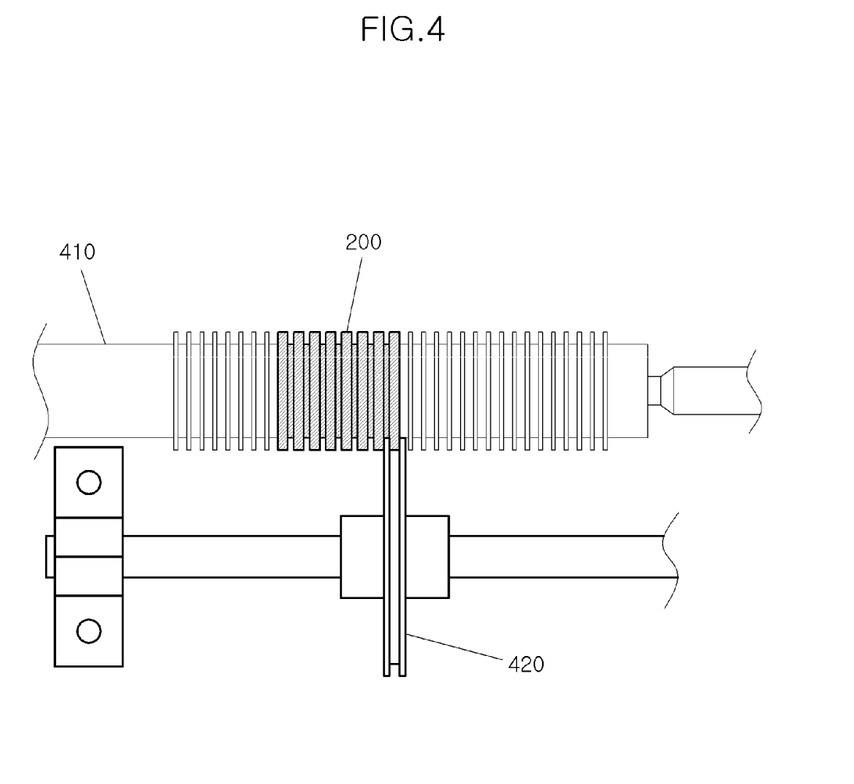
FIG. 4 is a schematic view exemplarily illustrating a process of molding a waterproof felt duct using a molding jig having a worm gear shape and a knife-type bending tool according to an exemplary embodiment of the present invention.

Next, in the step (d) of molding a duct using the waterproof felt base material cut into a desired shape, which is referred to as S140, as a molding jig having a worm gear shape rotates, the waterproof felt base material is wound around the outside of the molding jig 410, and then as the wound waterproof felt base material is bent with a knife-type bending tool 420, a duct 200 having a corrugated tube shape is formed, as shown in FIG. 4.

In the step (e) of heat-treating the duct, which is referred to as S150, to perform hot-melt adhesion between nonwoven fabrics of the waterproof belt base material bent and molded into a corrugated tube shape, the molded duct is heat-treated such that the molded duct is placed in an electric oven just as it is wound around the molding jig and heat-treated at 240 to 250° C. for 10 minutes to 60 minutes. The heat-treatment is performed at temperature of 245° C. for 30 minutes.

In the step of cooling the duct, which is referred to as S160, the heat-treated duct may be placed in a cooler and cooled for 5 to 30 minutes by cold air at 5 to 15° C. The duct cooled in the cooling step S160 is ejected from the molding jig, which is referred to as S170.

Figure 5:
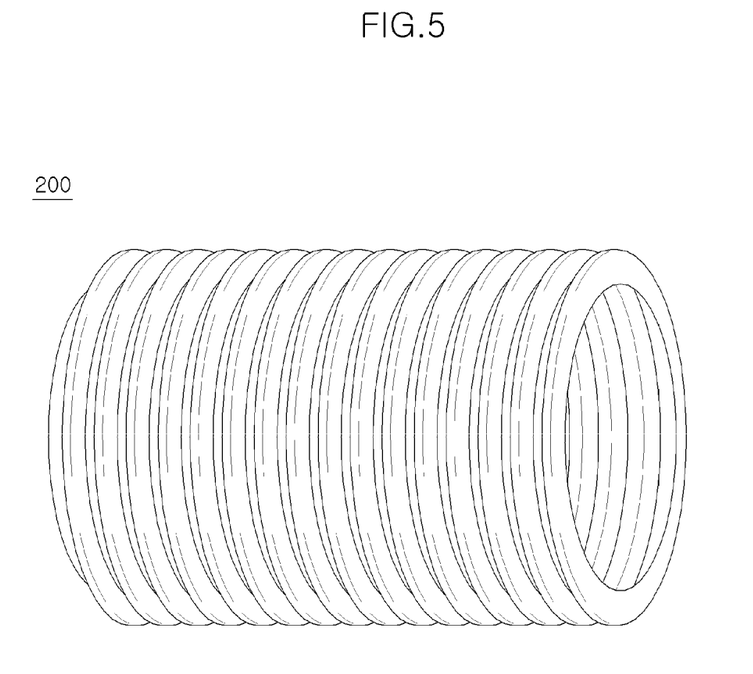
FIG. 5 is a perspective view showing appearance of a waterproof felt duct manufactured according to an exemplary embodiment of the present invention.

The waterproof felt duct formed by the above-described manufacturing method is as shown in FIG. 5. The waterproof felt duct is made of a waterproof felt base material having a multiple adhesion structure wherein the waterproof felt base material is formed by thermally adhering a plurality of laminated bodies, each of the laminated bodies including a first nonwoven fabric, a waterproof film laminated on the first nonwoven fabric and a second nonwoven fabric laminated on the waterproof film and wherein each of the laminated bodies is configured such that with reference to length from one end portion to the other end portion of the laminated body, length of the first nonwoven fabric is shorter than length of the waterproof film and length of the second nonwoven fabric is longer than the length of the waterproof film.

Figure 6:
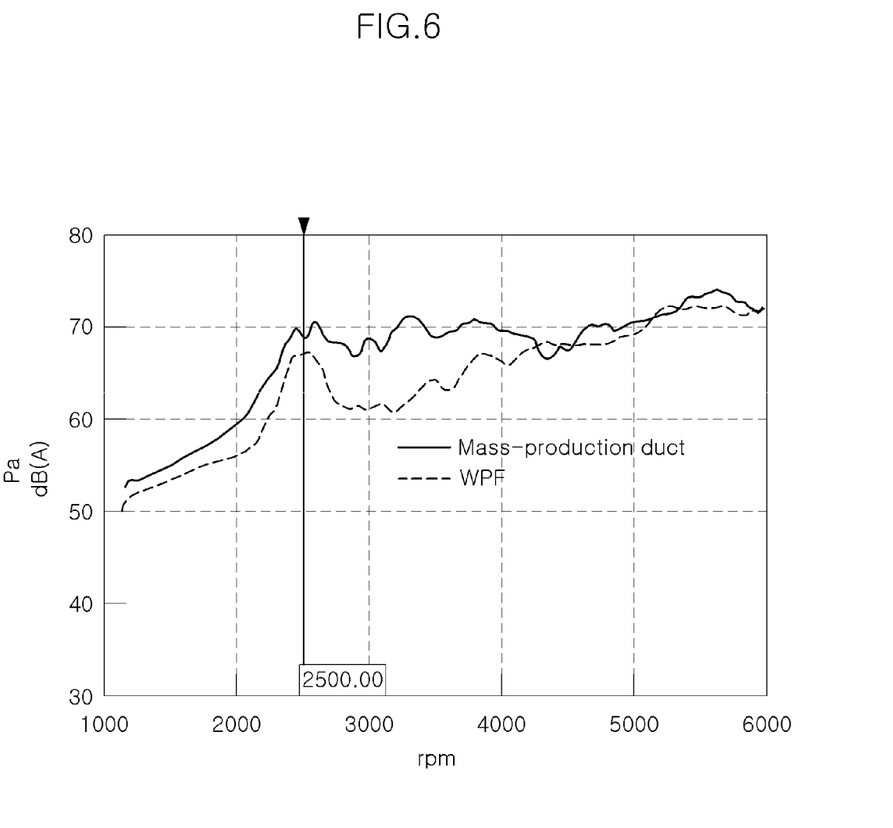
FIG. 6 is a noise evaluation result of a waterproof felt duct manufactured according to an exemplary embodiment of the present invention.
Figure 7:
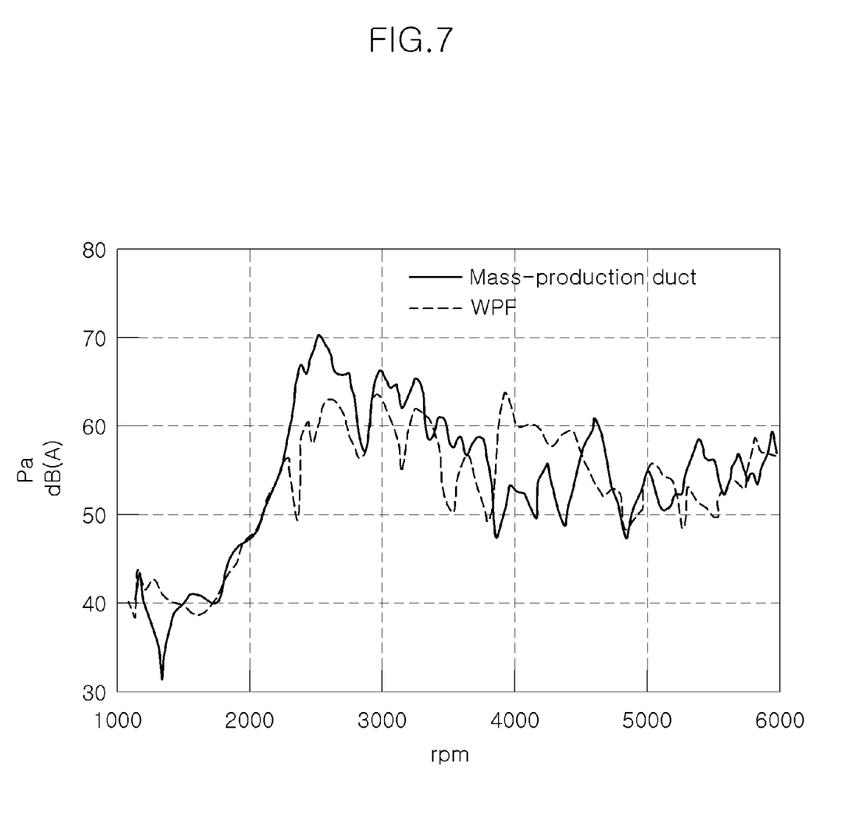
FIG. 7 is an evaluation result in a cold condition of a waterproof felt duct manufactured according to an exemplary embodiment of the present invention.
Figure 8:
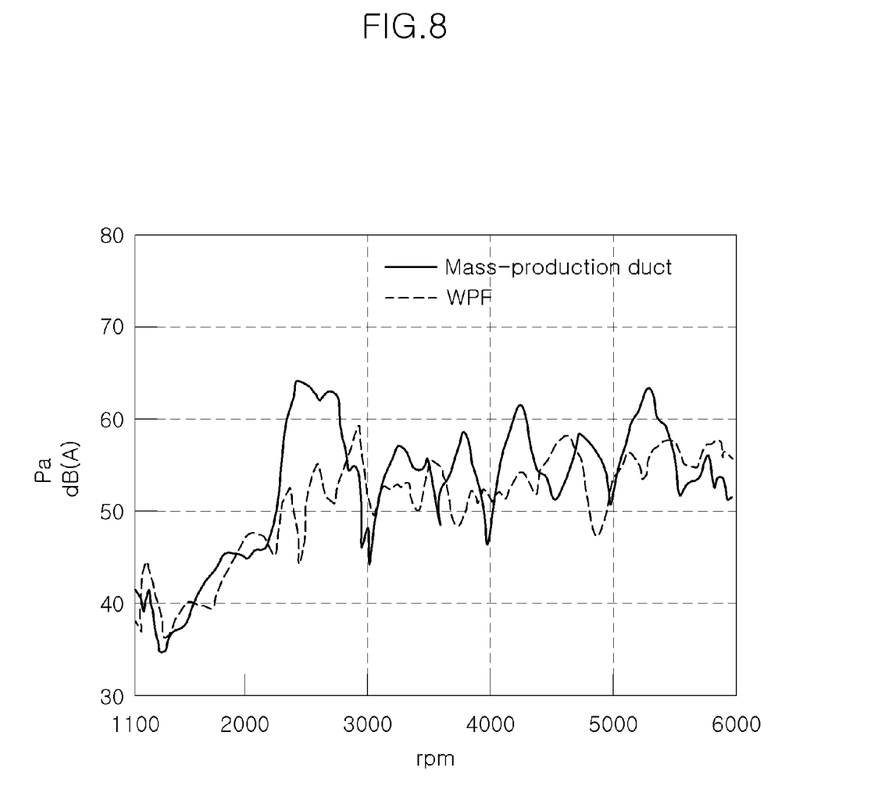
FIG. 8 is an evaluation result in a hot condition of a waterproof felt duct manufactured according to an exemplary embodiment of the present invention.

To compare noise and vibration generated in an engine and a vehicle body to which the waterproof felt duct manufactured according to an exemplary embodiment of the present invention as mentioned above is applied with those of existing ducts, noise, vibration and harshness 6 (NVH) were evaluated and the results are shown in FIGS. 6 to 8.

FIG. 6 shows a comparison result of noise at a driver's seat during acceleration. It is noted that the waterproof felt duct shows a difference of up to 10 dB(A) in all seats compared to the existing mass-production duct and that occurrence of noise in the waterproof felt duct is small.

FIG. 7 and FIG. 8 are the results of comparison between the existing duct and the waterproof felt duct of the present invention in cold and hot conditions, respectively.

As shown in FIG. 7, in the cold condition, that is, before the engine of a vehicle is heated to a certain proper temperature, the existing mass-production duct generates noise exceeding 70 dB(A) at maximum whereas the waterproof felt duct (WPF) of the present invention generates noise less than 65 dB(A) at maximum, confirming that noise generation in the waterproof felt duct is small as a whole.

As shown in FIG. 8, in the hot condition, that is, after the engine of the vehicle is heated to a certain proper temperature, the existing mass-production duct generates noise exceeding 65 dB(A) at maximum whereas the waterproof felt duct of the present invention generates noise less than 60 dB(A) at maximum. As a result, it is confirmed that noise generation in the waterproof felt duct is similar to or smaller than that in the existing mass-production duct in both cold and hot conditions.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for manufacturing a waterproof felt duct, the method comprising:
   (a) forming a plurality of laminated bodies, each laminated body formed by laminating a waterproof film on a side of a first nonwoven fabric and laminating a second nonwoven fabric on a side of the waterproof film opposite to the first nonwoven fabric;
   (b) forming a waterproof felt base material by arranging and thermally adhering the laminated bodies together;
   (c) cutting the waterproof felt base material into a target shape;
   (d) forming a molded duct by surrounding the waterproof felt base material cut into the target shape around an external surface of a molding jig;

(e) heat-treating the molded duct;
(f) cooling the heat-treated duct; and
(g) ejecting the cooled duct from the molding jig,
wherein, in step (a), each laminated body is formed such that with respect to a length from a first end portion to a second end portion of the laminated body taken in a longitudinal direction of the laminated body, a length of the first nonwoven fabric is shorter than a length of the waterproof film and a length of the second nonwoven fabric is longer than the length of the waterproof film, and
wherein, in step (b), the waterproof felt base material is formed by continuously arranging and adhering the laminated bodies such that a second nonwoven fabric of a second laminated body is accommodated at one end portion of a first nonwoven fabric of a first laminated body and on a lower surface of a waterproof film of the first laminated body.

2. The method for manufacturing the waterproof felt duct according to claim 1, wherein the first nonwoven fabric includes polyethylene terephthalate of 20 to 40% by weight and fibers of 60 to 80% by weight.

3. The method for manufacturing the waterproof felt duct according to claim 2, wherein the first nonwoven fabric includes the polyethylene terephthalate of 30% by weight and the fibers of 70% by weight.

4. The method for manufacturing the waterproof felt duct according to claim 1, wherein the waterproof film is a laminate made of a polyethylene film and a polyamide 6 film.

5. The method for manufacturing the waterproof felt duct according to claim 1, wherein the second nonwoven fabric includes polyethylene terephthalate of 60 to 80% by weight and fibers of 20 to 40% by weight.

6. The method for manufacturing the waterproof felt duct according to claim 5, wherein the second nonwoven fabric includes the polyethylene terephthalate of 70% by weight and the fibers of 30% by weight.

7. The method for manufacturing the waterproof felt duct according to claim 1, wherein in step (b), the waterproof felt base material is thermally adhered at a temperature of 130 to 160° C.

8. The method for manufacturing the waterproof felt duct according to claim 1, wherein the thermal adhesion is performed for 30 seconds while keeping a top portion of the waterproof felt base material at 160° C., and a bottom portion of the waterproof felt base material at 130° C.

9. The method for manufacturing the waterproof felt duct according to claim 1, wherein, in step (d), the duct is molded by bending the waterproof felt base material surrounded around the external surface of the molding jig by a bending tool as the molding jig rotates.

10. The method for manufacturing the waterproof felt duct according to claim 1, wherein in step (e), the molded duct is heat-treated at a temperature of 240 to 250° C. for 10 minutes to 60 minutes in an electric oven.

11. The method for manufacturing the waterproof felt duct according to claim 1, wherein in step (f), the heat-treated duct is cooled for 5 to 30 minutes by air at temperature of 5 to 15° C.

* * * * *